United States Patent [19]
Lucci

[11] 3,757,456
[45] Sept. 11, 1973

[54] TRIGGER AND BAIT ARRANGEMENT FOR MOUSE TRAP

[76] Inventor: Joseph A. Lucci, 3833 Beresford St., San Mateo, Calif. 94403

[22] Filed: July 11, 1972

[21] Appl. No.: 270,864

[52] U.S. Cl. .................................................. 43/81
[51] Int. Cl. ............................................... A01m
[58] Field of Search ....................................... 43/81

[56] References Cited
UNITED STATES PATENTS
1,930,886   10/1933   Scott ...................................... 43/81
3,430,380   3/1969    Poff ....................................... 43/81

FOREIGN PATENTS OR APPLICATIONS
24,588    1/1930   Australia ............................... 43/81
503,727   4/1939   Great Britain ........................ 43/81

Primary Examiner—Louis G. Mancene
Assistant Examiner—Daniel J. Leach
Attorney—Joseph F. Cole

[57] ABSTRACT

A trigger and bait arrangement for a mouse trap wherein a pair of spaced brackets are fixed to a base of the trap, one on each lateral side of a forwardly extending latching lever that is utilized for holding a swingably mounted bail in set position, one of the brackets defining a socket and the other bracket being fashioned with a slot, and an elongated edible trigger is adapted to overlie a free tip of the lever when the trap is set, with one end of the trigger being inserted into the socket and its other end is inserted into the slot, whereby the trap will be sprung when a mouse, or the like, nibbles through the trigger or withdraws the latter from the slot. The trigger extends diagonally relative to the length of the base when it is supported by the brackets, whereby the free tip of the lever may be moved laterally into a position to underlie the trigger when setting the trap.

4 Claims, 3 Drawing Figures

PATENTED SEP 11 1973 3,757,456

3,757,456

TRIGGER AND BAIT ARRANGEMENT FOR MOUSE TRAP

SUMMARY

An object of this invention is to provide a trigger and bait arrangement for a conventional mouse trap, wherein a pair of spaced brackets are fixed to the base of the trap, one of each lateral side of a forwardly extending latching lever that is used for holding a spring-pressed bail when the trap is set. One of the brackets defines a socket and the other being fashioned with a slot.

Moreover, an elongated edible trigger is adapted for overlying a free tip at the outer end of the lever when the trap is set, with one end of the trigger being inserted into the socket and its other end inserted into the slot, whereby the trap will be sprung when a mouse, or the like, nibbles through the trigger or withdraws the latter from the slot. The trigger extends diagonally relative to the length of the base when it is supported by the brackets, whereby the free tip of the lever may be moved laterally into a position underlying the trigger when setting the trap.

Other objects and advantages will appear as the specification continues, and the novel features of the invention will be pointed out in the appended claims.

BRIEF DESCRIPTION OF THE DRAWING

For a better understanding of the invention, reference should be made to the accompanying drawing, forming part of this specification, in which.

While I have shown only the preferred embodiment of the invention, it should be understood that various changes, or modifications, may be made within the scope of the appended claims without departing from the spirit thereof.

DETAILED DESCRIPTION OF THE PREFERRED EMBODIMENT

Figure 1:
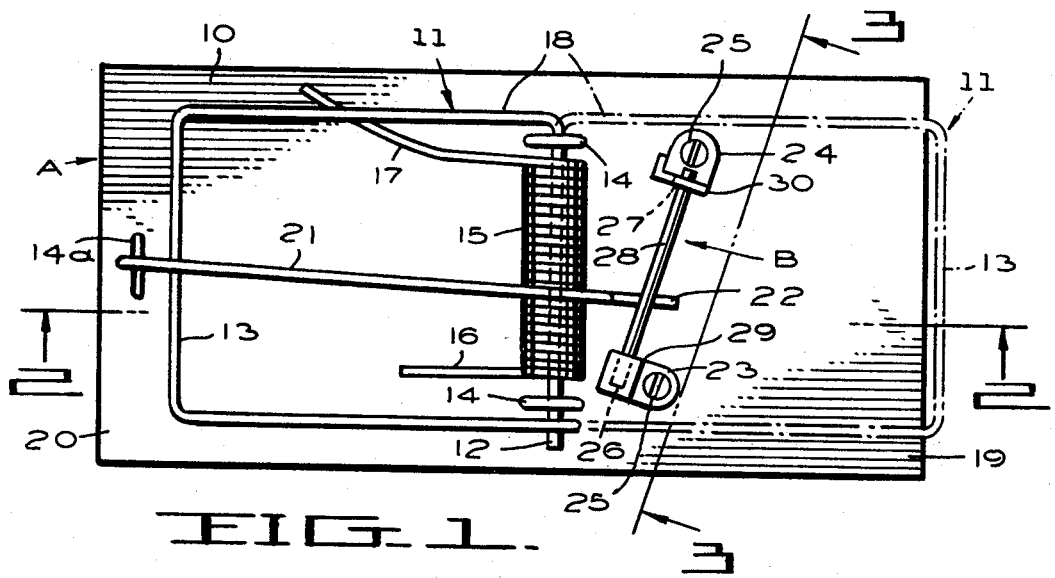
FIG. 1 is a top plan view of a mouse trap showing my improved trigger and bait arrangement incorporated therein.
Figure 2:
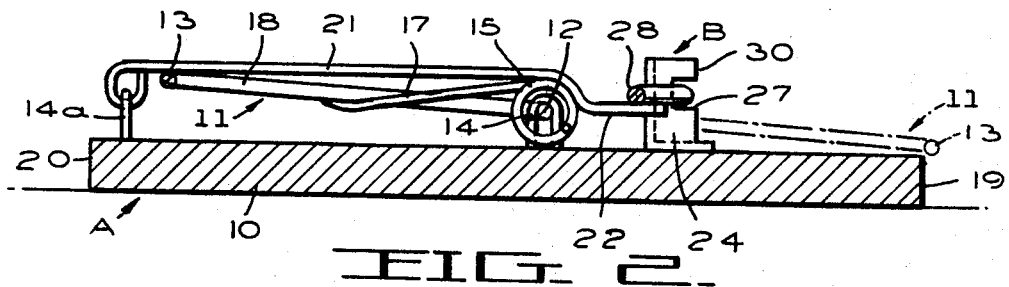
FIGS. 2 and 3 are longitudinal and transverse sectional views taken along the lines 2—2 and 3—3, respectively, of FIG. 1.

Referring now to the drawing in detail, it will be noted that a conventional mouse trap A is provided with my improved trigger and bait arrangement B, the full lines in FIGS. 1 and 2 showing the trap set while the dot-dash lines in these same views disclosing the trap sprung.

In its structural details, the mouse trap A is provided with a base 10 and a bail 11 of rectangular outline having transverse rods 12 and 13 at its opposite ends. Staples 14 are driven into the base 10 so as to swingably secure the rod 12 to an intermediate portion of the base. A coil spring 15 encircles the rod 12, and this spring has one end 16 bearing against the base, with its other end 17 engaging with the side 18 of the bail. This spring yieldingly urges the bail into a position wherein its rod 13 will clamp adjacent the front end 19 of the base 10 when the trap is sprung, as shown by dot-dash lines in FIGS. 1 and 2.

However, the bail 11 is swingable against the action of the spring 15 into set position, as shown by full lines in FIGS. 1 and 2, wherein the rod 13 will be disposed near the rear end 20 of the base. A latching lever 21 has one end thereof swingably secured by staple 14a to the base near the rear end of the latter with the lever being movable to overlie the rod 13 of the bail 11 and with the lever extending generally lengthwise of the base when the trap is set. The lever has a free tip 22 at its outer end.

Turning now to the details of the trigger and bait arrangement B, it will be seen that a pair of spaced brackets 23 and 24 are fixed to the base 10 by any suitable means, for examples, screws 25, as shown in FIG. 1, with one bracket on each lateral side of the forwardly extending latching lever 21. The bracket 23 defines a socket 26, while bracket 24 is fashioned with a slot 27. An elongated edible trigger 28 is adapted to overlie the free tip 22 of the lever 21 when the trap is set, with one end of the trigger being inserted into the socket 26 and its other end inserted into the slot 27, whereby the trap will be sprung when a mouse, or the like, nibbles through the trigger or withdraws the latter from the slot. The edible trigger 28 may be made from spaghetti coated with cheese.

Figure 3:
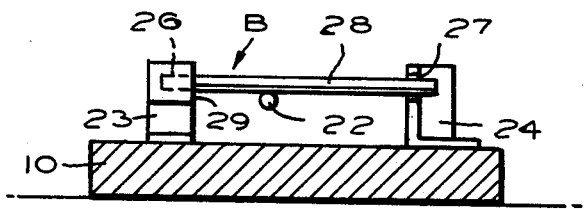

As clearly shown in FIG. 3, the socket 26 is disposed substantially horizontal and extends into the bracket 23 from an edge 29 of the latter that faces towards the slotted bracket 24, thus facilitating the insertion of the trigger 28 into the socket while setting the trap. Also, the slot 27 is disposed substantially horizontal and extends rearwardly from a front edge 30 of the slotted bracket 24, thus facilitating the insertion of the trigger 28 into the slot while setting the trap or withdrawal of the trigger from the slot when the trap is sprung.

It will be apparent from FIG. 1 that the trigger 28 extends diagonally relative to the length of the base 10 when it is supported by the brackets 23 and 24, whereby the free tip 22 of the lever 21 may be moved laterally to a position underlying the trigger when setting the trap.

I claim:

1. The combination with a mouse trap provided with a base, a bail of rectangular outline having transverse rods at its opposite ends, means swingably securing one of the rods to a intermediate portion of the base, a spring yieldingly urging the bail into a position wherein the other rod will clamp adjacent a front end of the base when the trap is spring, the bail being swingeable against the action of the spring into set position wherein the other rod will be disposed near a rear end of the base, and a latching lever having one end thereof swingably secured to the base near the rear end of the latter with the lever being movable to overlie said other rod and with the lever extending generally lengthwise of the base when the trap is set, the lever having a free tip at its outer end, of a trigger and bait arrangement defining:

a. pair of spaced brackets fixed to the base, one on each lateral side of the forwardly extending latching lever;
   b. one of the brackets defining a socket, and the other bracket being fashioned with a slot;
   c. and an elongated edible trigger overlying the free tip of the lever when the trap is set, with one end of the trigger being inserted into the socket and its other end inserted into the slot, whereby the trap will be sprung when a mouse, or the like, nibbles through the trigger or withdraws the latter from the slot.

2. The combination as set forth in claim 1;

d. and in which the socket is disposed substantially horizontal and extends into its bracket from an edge of this bracket that faces towards the slotted bracket, thus facilitating the insertion of the trigger into the socket while setting the trap.

3. The combination as set forth in claim 1;

d. and in which the slot is disposed substantially horizontal and extends rearwardly from a front edge of the slotted bracket, thus facilitating the insertion of the trigger into the slot while setting the trap or withdrawal of the trigger from the slot when the trap is sprung.

4. The combination as set forth in claim 1;

d. and in which the trigger extends diagonally relative to the length of the base when it is supported by the brackets, whereby the free tip of the lever may be moved laterally into a position underlying the trigger when setting the trap.

* * * * *